(12) United States Patent
Durazzani et al.

(10) Patent No.: US 6,997,195 B2
(45) Date of Patent: Feb. 14, 2006

(54) ERGONOMIC DISHWASHING MACHINE

(75) Inventors: Piero Durazzani, Porcia (IT); Daniele Favaro, Pramaggiore (IT)

(73) Assignee: Electrolux Zanussi S.p.A., Pordenone (IT)

( * ) Notice: Subject to any disclaimer, the term of this patent is extended or adjusted under 35 U.S.C. 154(b) by 334 days.

(21) Appl. No.: 10/276,889

(22) PCT Filed: Apr. 19, 2001

(86) PCT No.: PCT/EP01/04436

§ 371 (c)(1),
(2), (4) Date: Mar. 17, 2003

(87) PCT Pub. No.: WO01/93741

PCT Pub. Date: Dec. 13, 2001

(65) Prior Publication Data

US 2004/0007256 A1    Jan. 15, 2004

(30) Foreign Application Priority Data

Jun. 7, 2000    (IT)    .......................... PN2000A0037

(51) Int. Cl.
*B08B 3/00*    (2006.01)

(52) U.S. Cl. ..................... 134/58 D; 134/84; 134/85; 134/88; 134/200; 134/58 R; 134/198

(58) Field of Classification Search ............ 134/83–88, 134/135, 111, 115 R, 133, 200; 422/300; 312/406, 228.1
See application file for complete search history.

(56) References Cited

U.S. PATENT DOCUMENTS

| | | | | |
|---|---|---|---|---|
| 3,177,095 A | * | 4/1965 | Gibson | 134/25.2 |
| 4,491,375 A | * | 1/1985 | Ugalde | 312/249.9 |
| 4,653,520 A | * | 3/1987 | Alvemarker | 134/157 |
| 4,739,781 A | * | 4/1988 | Casoli | 134/115 R |
| 6,260,565 B1 | * | 7/2001 | Welch et al. | 134/200 |
| 6,289,908 B1 | * | 9/2001 | Kelsey | 134/200 |

FOREIGN PATENT DOCUMENTS

| | | |
|---|---|---|
| DE | 25 18 994 | 11/1976 |
| EP | 0 585 905 | 3/1994 |
| FR | 1 075 216 | 10/1954 |
| WO | WO 98/33426 | 8/1998 |
| WO | WO 00/16681 | 3/2000 |

* cited by examiner

*Primary Examiner*—Michael Barr
*Assistant Examiner*—Sarah E. Husband
(74) *Attorney, Agent, or Firm*—Pearne & Gordon LLP

(57) ABSTRACT

The dishwashing machine has at least two washing vessels (10–12) that are separated from each other and are part of a structural assembly (3) that is capable of being pulled out as a whole from a casing (1) in which it is housed. Each such washing vessel (10–12) has at least a loading lid or door (17) that can be opened when the structural assembly (3) is in its pulled-out position.

11 Claims, 4 Drawing Sheets

ERGONOMIC DISHWASHING MACHINE

This application claims the benefit of International Application Number PCT/EP01/04436, which was published in English on Dec. 13, 2001.

The present invention refers to a dishwashing machine for household or similar application according to the introductory part of the appended claim 1.

Dishwashing machine manufacturer are generally known to be currently facing and dealing with two kinds of major technical problems, ie.:

a) making the machines more flexible functionally in view of enabling the user to handle washloads that may each time be different from each other either quantitatively (eg. eight or twelve table settings, according to the actual needs) and/or qualitatively (eg. crystal glasses and heavily soiled pans), and b) making the machines much more convenient to use in practice, in particular by making it less awkward or tiresome for the washload items to be loaded in and removed from the machine, as well as for the washing aids (ie. the detergent and the rinsing aid) and the salt for the water softener to be filled in or added.

A recently proposed solution for these problems, if the state of the art that appears to have the greatest relevance to the present invention, is disclosed in the U.S. Pat. No. 5,470,142 and the great number of divisional patents thereof. The dishwashing machine covered by such a patent publication has a frontally open outer casing so as to allow for one or two modular units provided in the form of drawers that are open on top, and which are capable of being closed in a sealed, ie. watertight manner on their upper face when pushed in their retracted position, to be pulled out separately.

As a matter of fact, each such drawer is practically a small dishwashing machine in itself, since it is provided with its own support means for the washload items, a complete water handling assembly comprising a rotating spray arm and means for filtering, recirculating and discharging the wash liquor, actuation and control means of the respective water handling assembly, and a washing aid dispenser.

It can in the first place be readily appreciated that such a prior-art solution of the afore mentioned problems is relatively unreliable, further to inherently expensive, owing to the obvious need for many functional component parts to be provided twofold, as well as the equally obvious need for a definitely complex sealing system to be implemented (in this connection, reference should be made in particular to the divisional U.S. Pat. No. 5,651,382) in order to prevent water from leaking through the covers of the various drawers.

Worth being mentioned in this connection is also the dishwashing machine that is described in the U.S. Pat. No. 4,179,307, in which the outer casing is entirely manufactured of plastic material in a single-piece construction with the inner washing vessel, the latter being adapted to accommodate a pair of drawers arranged above each other. Each such drawer comprises both support means for the washload items and a rotating spray arm with its own water supply pipe that is adapted to be connected in a bayonet-fitting manner to a vertical water-delivery conduit coming from a single recirculation pump that is conventionally arranged underneath the washing vessel of the machine. This prior-art patent does not offer any further teaching in view of solving the afore cited technical problems, in particular as far as the way is concerned, in which the desired functional flexibility and an improved ergonomics of the dishwashing machine can actually be obtained.

It therefore is a main purpose of the present invention to provide a dishwashing machine which is capable of most successfully solving both afore mentioned technical problems and, by avoiding useless duplications of component parts, turns out to be particularly simple, low-cost, ergonomic and reliable. According to the present invention, this aim is reached in a dishwashing machine having the characteristics as recited in the appended claims.

Features and advantages of the present invention can anyway be more readily understood from the description that is given below by way of non-limiting example with reference to the accompanying drawing, in which.

Figure 2:
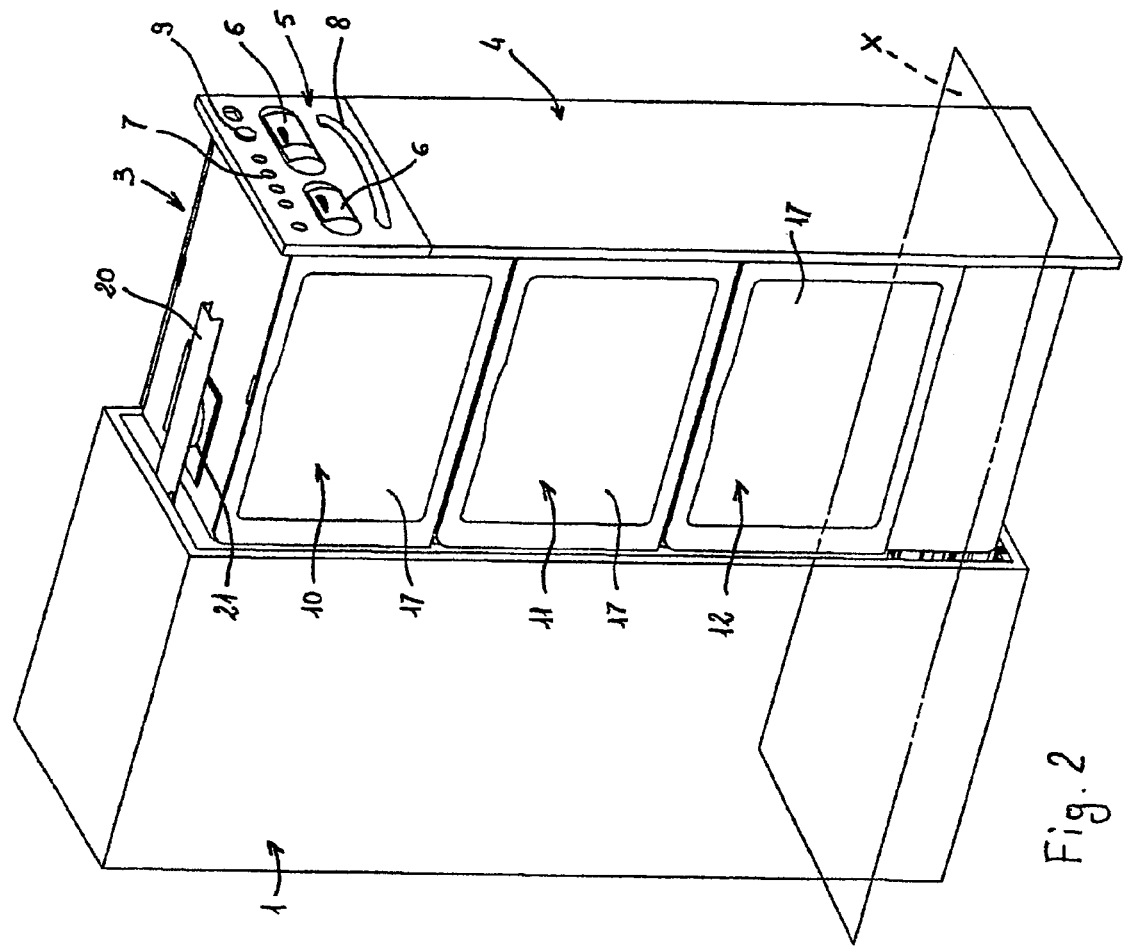
FIG. 2 is a view similar to the one appearing in FIG. 1, but with the pull-out assembly in its open position.

With reference to the above Figures, the dishwashing machine according to the present invention comprises an outer casing 1, which preferably rests on the floor through height-adjustable feet 2. The outer casing 1 is substantially in the form of a parallelepiped, whose major dimension is preferably the height H, which may for instance be in the order of 130 cm, as compared to a width dimension L of approx. 45 cm and a depth dimension of approx. 60 cm, and may be fabricated with traditional manufacturing techniques out of wood, sheet-metal or plastic material. In the interior of said outer casing 1, which has its front face open to this purpose, there is adapted to be accommodated a pull-out structural and functional assembly that is generally indicated at 3 in the Figures.

The pull-out assembly 3 comprises in turn a front panel 4, which is preferably provided with a handle 8 and carrying a control board 5, or the like, and which encloses in a watertight manner dispensing means 6 for the washing products (ie. detergent and rinsing aid), the reservoir for the salt used in connection with a water softener apparatus, and the actuation and control devices of the machine, the latter ones being generally indicated at 7 in the Figures. Owing to reasons of greater simplicity, these components are not described and illustrated in detail, since, they do not require being implemented or made in any substantially different manner as compared with the one that is generally known to those skilled in the art.

The structural assembly 3 also comprises at least two (three in the example being described here) washing vessels 10, 11, 12 which are attached to the panel 4 and are aligned with each other, preferably arranged above each other vertically.

Moreover, as this will be described in greater detail further on, the washing vessels 10–12 are substantially separated from each other, although being capable of being pulled out as a whole from the casing 1, jointly with the entire structural assembly 3.

Figure 3:
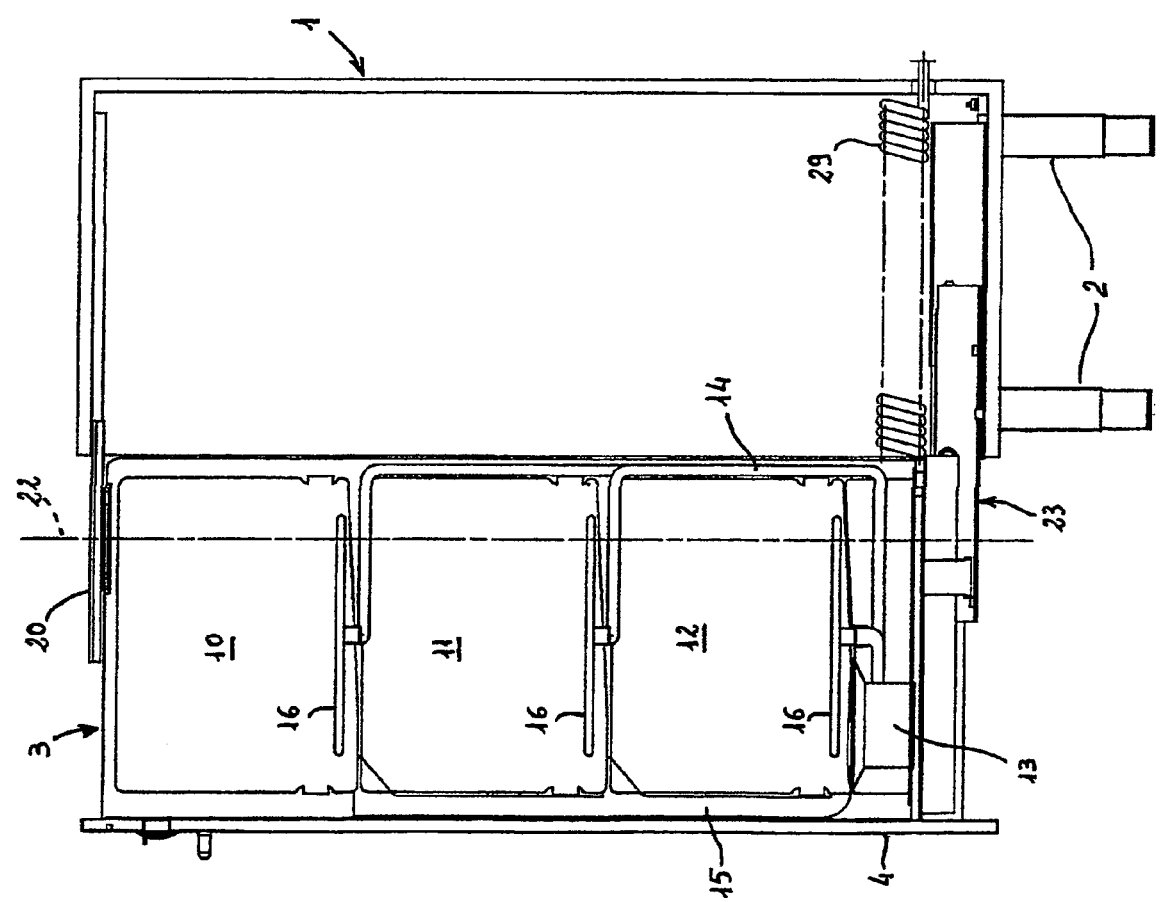
FIG. 3 is a schematical vertical-section view along the line III—III of FIG. 4.

With particular reference to FIG. 3, the dishwashing machine comprises a sump 13 for collecting the washing liquor. From such a sump, by means of a circulation pump (not shown), the same washing liquor can be delivered under pressure, through conduits 14, to respective rotating spray arms 16 housed in the washing vessels 10–12. The vessels themselves communicate at the bottom with a return conduit 15, through which the washing liquor can be recirculated towards the collecting sump 13.

In a preferred manner, the collecting sump 13 along with the circulation pump, the delivery conduits 14 and the return conduit 15 (together with other traditional component parts needed for operation, such as a drain pump, a heating element, etc.) form an electric-hydraulic functional unit connected in common to the washing vessels 10–12 and mounted on the structural assembly 3.

In a preferred manner, the washing water-carrying, ie. hydraulic circuit of the dishwashing machine is substantially of the type described in EP-A-0 930 044, so that the washing vessels 10–12 are capable of being operated either selectively, or two by two, or all together at the same time, according to the actual needs.

Figure 1:
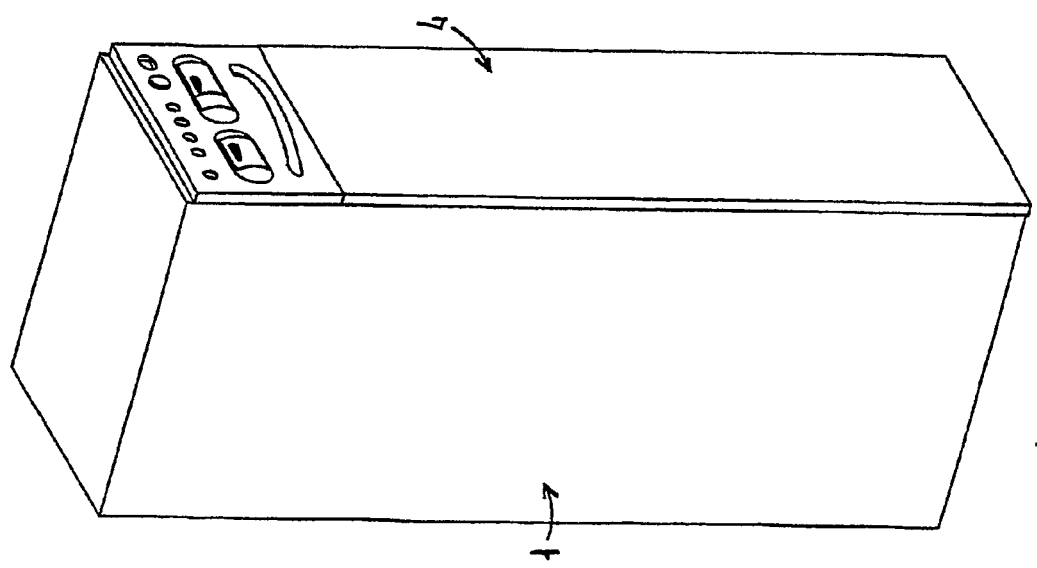
FIG. 1 is a three-dimensional view of the outside of a free-standing model of a dishwashing machine according to the present invention, with the pull-out assembly thereof in its closed position.

Moreover, the structural assembly 3 is preferably adapted to be connected electrically and hydraulically to the respective fixed power and water supply systems, as well as to the drain system, by means of respective flexible connecting means of the telescopic or similar type, so as to make it possible for the dishwashing machine to operate both when the structural assembly 3 is in its retracted position as illustrated in FIG. 1, and when the same assembly is on the contrary in its pulled-out position illustrated in FIGS. 2 and 3. For reasons of greater descriptive simplicity, the above cited fixed power and water supply mains and the drain system are not shown in the Figures, whereas the above mentioned connecting means are generally indicated at 29 in FIG. 3.

Anyway, it is only when the structural assembly 3 is pulled out that the washing vessels 10–12 are accessible through at least a loading lid or door capable of being closed in a watertight manner, whereas the front panel 4 closes the corresponding front aperture of the casing 1 when the assembly 3 is in its retracted position.

In a preferred manner, each one of said washing vessels is provided with at least an own loading lid 17 in correspondence of one of the sides, or even both sides, of the structural assembly 3.

As an alternative thereto, the structural assembly 3 may of course have an enlarged, ie. widened-out drawer-like structure, instead of a column-like structure, with the washing vessels 10–12 arranged side-by-side horizontally and provided each one with an own loading lid on their top.

In any case, such loading lids 17 may be substantially transparent, in such a manner as to make it possible for the user to visually check the interior of said washing vessels 10–12 also when the dishwashing machine is operating with the assembly 3 in its pulled-out position.

Figure 4:
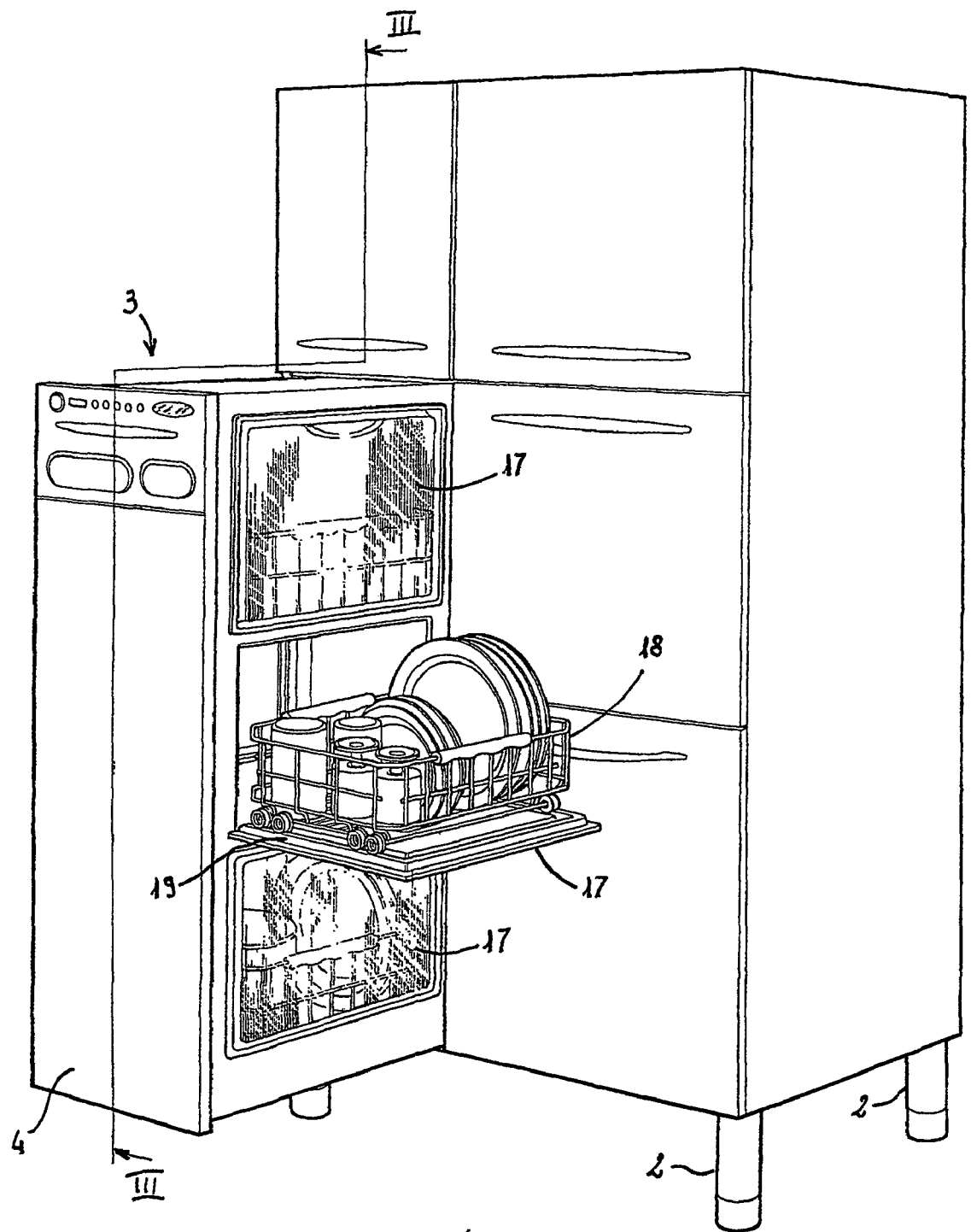
FIG. 4 is a three-dimensional view of the dishwashing machine illustrated in FIG. 2, as built-in in a fitted kitchen furniture arrangement, with the pull-out assembly thereof in its open position.

In the preferred case illustrated here, in which the washing vessels 10–12 are arranged on top of each other, each one of said vessels preferably comprises a pair of lids 17, ie. a lid on each side, in such a manner as to maximize the versatility and the convenience of both the operations of loading and unloading the washload items relative to the washing vessels themselves, and the installation of the entire dishwashing machine. In this case, furthermore, the washing vessels 10–12 will each one accommodate at least a washload support rack 18 (FIG. 4) which is preferably capable of sliding along guides 19 that are adapted to enable the same rack to be pulled out from either side indifferently.

Figure 5:
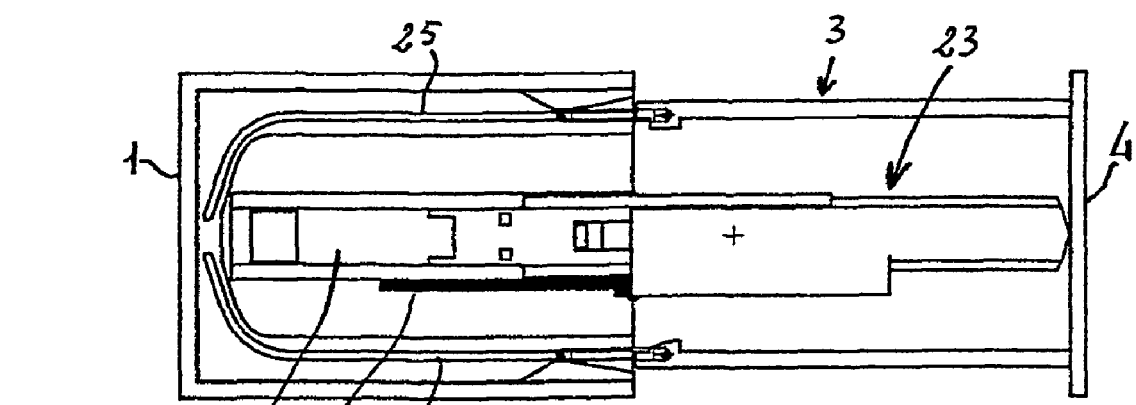

With reference to also FIGS. 5 through to 7, the structural assembly 3 is connected to the casing 1 through upper sliding runners 20 of the telescopic or similar type, on which the assembly 3 is hinged pivotally about a vertical axis 22 by means of a bracket 21. Correspondingly, the assembly 3 is connected on its lower side to the casing 1 through guiding means 23, which are also of the telescopic or similar type, which are integrated by a pair of articulated joints 24, whose front end portions are hinged on respective sides of the body of the assembly 3, and whose rear end portions are adapted to slide along respective runners 25 provided inside the casing 1.

Figure 6:
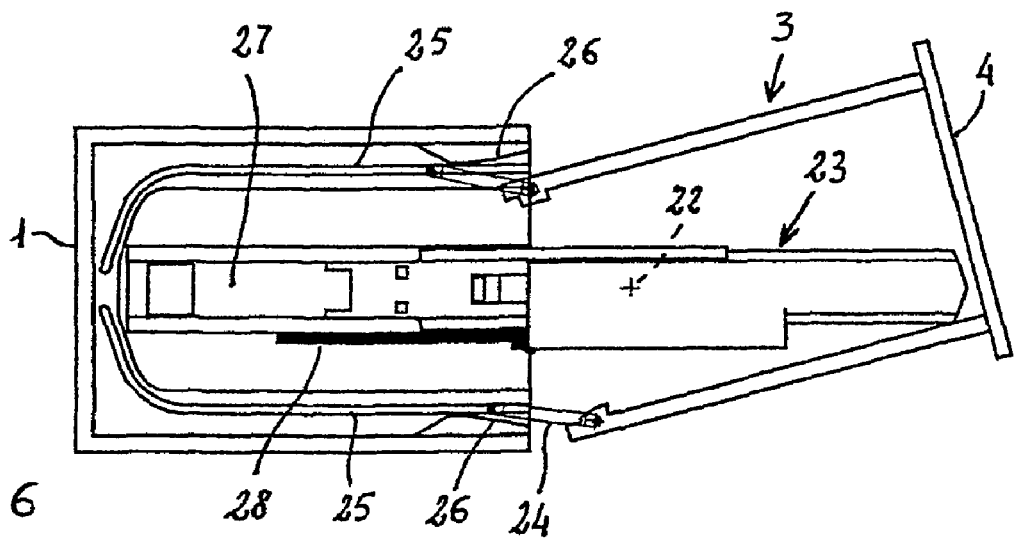
FIGS. 5, 6 and 7 are top views, in respective operating positions, of a section taken in the proximity of the base of the machine, at a level that is schematically illustrated with a virtual plane X in FIG. 2.
Figure 7:
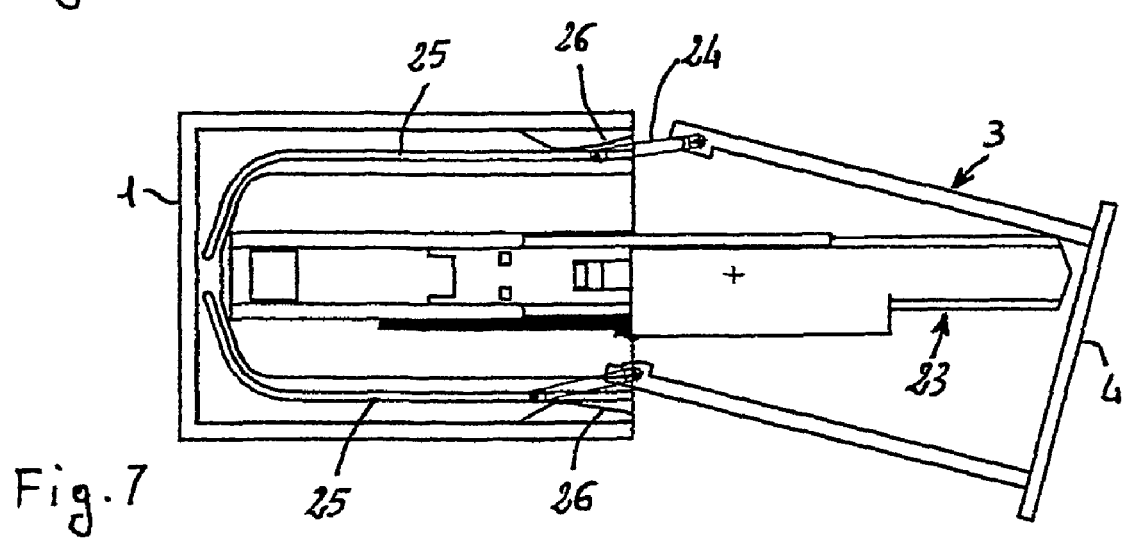

In practice, when the structural assembly 3 is pulled out frontally from the casing 1, as this is illustrated in FIGS. 2, 3 and 5, the same can also be panned, ie. turned about the axis 22 (either to the right or to the left, as illustrated in FIGS. 6 and 7, respectively) by an angle that is determined by appropriate stop means, such as for example by the abutment of the guiding means 23 against the sides of the body of the structural assembly 3. Such a panning movement makes of course it possible for the washing vessels 10–12 to be much more conveniently accessible; furthermore, it makes it possible for the loading lids or doors 17 thereof to be opened without any problem arising from their stumbling against nearby kitchen furniture cabinets, in the preferred in which the dishwashing machine is of the built-in or similar type.

In a preferred manner, on the internal side surfaces of the casing 1 there are provided respective inclined-plane or similar actuating surfaces 26, which are adapted to co-operate with the articulated joints 24 in such a manner as to enable the body of the structural assembly 3 to become automatically aligned to the casing 1 when the same assembly 3 is pushed towards its retracted position after having been pulled out and turned aside. This prevents possible component parts from striking against each other, and getting jammed, and makes it possible for the dishwashing machine to be advantageously much more convenient and easier to close.

It will of course be appreciated that the above described dishwashing machine can be subjected to a number of modifications without departing from the scope of the present invention.

For instance, closing and/or opening the dishwashing machine to and from said pulled-out and retracted positions of the structural assembly 3 may be further facilitated by the provision of such actuating means as for instance a hydraulic piston or an electric motor 27 (FIGS. 5–7) adapted to co-operate with a rack rail 28 connected to the guiding means 23. In such a case, the operation of the motor 27 to pull out and/or retract the assembly 3 can be advantageously actuated through a push-button 9, or the like, provided on the control board 5 of the machine.

What is claimed is:

1. Ergonomic dishwashing machine comprising a functional electric-hydraulic unit for collecting, recirculating and discharging the washing liquor, as well as for delivering the same liquor under pressure to rotating spray means provided in at least two washing vessels, wherein said washing vessels (10–12) are substantially separated from each other and are a part of a structural assembly (3) that is adapted to be pulled out as a whole from a casing (1) in which it is housed, in such a manner as to allow for access to be only gained to at least a loading door or lid (17) of said washing vessels (10–12) when said structural assembly (3) is in its pulled-out position, wherein said washing vessels (10–12) are arranged on top of each other and are each provided with a loading lid or door (17) in correspondence with at least one side of the structural assembly (3).

2. Dishwashing machine according to claim 1, wherein the structural assembly (3) also comprises said functional electric-hydraulic unit (13–15), which is connected in common to said washing vessels (10–12).

3. Dishwashing machine according to claim 1, wherein the structural assembly (3) is capable of being connected electrically and hydraulically to the respective fixed power and water supply systems, as well as to the drain system, by means of respective flexible connecting means (29), which are adapted to make it possible for the dishwashing machine to operate both when the structural assembly (3) is in its retracted position and when the same assembly is on the contrary in its pulled-out position with respect to the casing (1) housing it.

4. Dishwashing machine according to claim 1, wherein said washing vessels (10–12) are provided in a horizontal side-by-side arrangement with respect to each other and are each one provided with at least an own loading lid or door (17) in correspondence of the top side of the pull-out assembly (3).

5. Dishwashing machine according to claim 1, wherein said structural assembly (3) comprises a front panel (4) adapted to close a corresponding front aperture of the casing (1) housing it, when the assembly (3) is in its retracted position inside the same casing (1).

6. Dishwashing machine according to claim 1, wherein said loading lid or door (17) is substantially transparent.

7. Dishwashing machine according to claim 1, wherein each one of said washing vessels (10–12) accommodates at least a rack (18) for supporting the washload items, which is capable of sliding on runners (19) adapted to allow said rack to be pulled out selectively from either side thereof, through one of said loading lids or doors (17).

8. Dishwashing machine according to claim 1, wherein said structural assembly (3) is connected to the casing (1) through sliding runners (20–23), on which the same assembly (3) is hinged pivotally about a substantially vertical axis (22) so that the body of the structural assembly (3) can be turned about said axis (22) when it is pulled out from the casing (1).

9. Ergonomic dishwashing machine comprising a functional electric-hydraulic unit for collecting, recirculating and discharging the washing liquor, as well as for delivering the same liquor under pressure to rotating spray means provided in at least two washing vessels, wherein said washing vessels (10–12) are substantially separated from each other and are a part of a structural assembly (3) that is adapted to be pulled out as a whole from a casing (1) in which it is housed, in such a manner as to allow for access to be only gained to at least a loading door or lid (17) of said washing vessels (10–12) when said structural assembly (3) is in its pulled-out position, wherein said structural assembly (3) is connected to the casing (1) through sliding runners (20–23), on which the same assembly (3) is hinged pivotally about a substantially vertical axis (22) so that the body of the structural assembly (3) can be turned about said axis (22) when it is pulled out from the casing (1), and wherein there are provided at least a pair of articulated joints (24), whose front end portions are hinged on respective sides of the body of the structural assembly (3), and whose rear end portions are adapted to slide along respective runners (25) provided inside the casing (1).

10. Dishwashing machine according to claim 9, wherein on the internal side surfaces of the casing (1) there are provided respective actuating surfaces (26), which are adapted to co-operate with said articulated joints (24) in such a manner as to enable the body of the structural assembly (3) to become automatically aligned to the casing (1) when the same assembly (3) is pushed back in its retracted position.

11. Ergonomic dishwashing machine comprising a functional electric-hydraulic unit for collecting, recirculating and discharging the washing liquor, as well as for delivering the same liquor under pressure to rotating spray means provided in at least two washing vessels, wherein said washing vessels (10–12) are substantially separated from each other and are a part of a structural assembly (3) that is adapted to be pulled out as a whole from a casing (1) in which it is housed, in such a manner as to allow for access to be only gained to at least a loading door or lid (17) of said washing vessels (10–12) when said structural assembly (3) is in its pulled-out position, wherein said structural assembly (3) is connected to the casing (1) through sliding runners (20–23), on which the same assembly (3) is hinged pivotally about a substantially vertical axis (22) so that the body of the structural assembly (3) can be turned about said axis (22) when it is pulled out from the casing (1), and wherein there are provided means (27) that are adapted to automatically actuate said structural assembly (3) to move to and from said pulled-out and retracted positions thereof with respect to said casing (1).

* * * * *